(12) United States Patent
Waterman

(10) Patent No.: US 11,108,739 B2
(45) Date of Patent: Aug. 31, 2021

(54) FIREWALL INCORPORATING NETWORK SECURITY INFORMATION

(71) Applicant: BlackBerry Limited, Waterloo (CA)

(72) Inventor: Nick Mark Waterman, Waterloo (CA)

(73) Assignee: BlackBerry Limited, Waterloo (CA)

( * ) Notice: Subject to any disclaimer, the term of this patent is extended or adjusted under 35 U.S.C. 154(b) by 210 days.

(21) Appl. No.: 15/900,555

(22) Filed: Feb. 20, 2018

(65) Prior Publication Data

US 2019/0260712 A1   Aug. 22, 2019

(51) Int. Cl.
*H04L 29/06* (2006.01)
*H04L 9/08* (2006.01)

(52) U.S. Cl.
CPC ......... *H04L 63/0263* (2013.01); *H04L 9/08* (2013.01); *H04L 63/0227* (2013.01); *H04L 63/0428* (2013.01); *H04L 63/0485* (2013.01); *H04L 63/164* (2013.01); *H04L 63/166* (2013.01); *H04L 63/20* (2013.01); *H04L 63/0272* (2013.01); *H04L 63/126* (2013.01)

(58) Field of Classification Search
None
See application file for complete search history.

(56) References Cited

U.S. PATENT DOCUMENTS

| | | | | |
|---|---|---|---|---|
| 6,631,416 B2 * | 10/2003 | Bendinelli | .......... | H04L 12/4641 709/217 |
| 6,697,857 B1 * | 2/2004 | Dixon | .................. | H04L 63/164 709/202 |
| 6,772,348 B1 * | 8/2004 | Ye | ....................... | H04L 63/0227 713/160 |
| 7,386,881 B2 * | 6/2008 | Swander | ................. | H04L 63/08 370/392 |
| 7,596,806 B2 * | 9/2009 | Chen | ................... | H04L 63/0209 713/153 |
| 7,913,294 B1 * | 3/2011 | Maufer | ................... | H04L 12/66 370/389 |
| 8,166,534 B2 | 4/2012 | Yariv et al. | | |
| 9,647,988 B2 * | 5/2017 | May | .................... | H04L 63/0272 |

(Continued)

OTHER PUBLICATIONS

No stated author; "Step-by-Step Guide to Internet Protocol Security (IPSec)"; 2000; Retrieved from the Internet http://www.di-srv.unisa.it/professori/ads/corso-security/www/CORSO-0001/win2000/ipsec/ipsecsteps.htm; pp. 1-23, as printed (Year: 2000).*

(Continued)

*Primary Examiner* — Michael W Chao
(74) *Attorney, Agent, or Firm* — Fish & Richardson P.C.

(57) ABSTRACT

A method of implementing a firewall incorporating network security information includes configuring a firewall at a first computing device. The firewall is configured to initiate the first computing device to establish a secured connection with a second computing device in response to the firewall determining that a data packet received from the second computing device or to be transmitted to the second computing device is unencrypted. The first computing device detects the data packet, where the data packet is received from the second computing device or to be transmitted to the second computing device. In response to detecting that the data packet is unencrypted, the secured connection is established between the first computing device and the second computing device.

14 Claims, 3 Drawing Sheets

(56) References Cited

U.S. PATENT DOCUMENTS

| | | | |
|---|---|---|---|
| 10,587,577 B2* | 3/2020 | Adler | H04L 63/0236 |
| 2002/0095603 A1* | 7/2002 | Godwin | H04L 63/102 |
| | | | 726/15 |
| 2003/0018813 A1* | 1/2003 | Antes | H04L 67/1008 |
| | | | 709/245 |
| 2003/0069973 A1* | 4/2003 | Ganesan | H04L 29/06 |
| | | | 709/226 |
| 2003/0182431 A1* | 9/2003 | Sturniolo | H04W 76/20 |
| | | | 709/227 |
| 2004/0088537 A1* | 5/2004 | Swander | H04L 63/0464 |
| | | | 713/153 |
| 2004/0143734 A1* | 7/2004 | Buer | H04L 63/0485 |
| | | | 713/153 |
| 2004/0243707 A1* | 12/2004 | Watkinson | H04L 63/0263 |
| | | | 709/225 |
| 2004/0250131 A1* | 12/2004 | Swander | H04L 63/0263 |
| | | | 726/11 |
| 2005/0022011 A1* | 1/2005 | Swander | H04L 63/0227 |
| | | | 726/4 |
| 2005/0138416 A1* | 6/2005 | Qian | H04L 63/08 |
| | | | 726/4 |
| 2005/0177722 A1* | 8/2005 | Vaarala | H04L 63/02 |
| | | | 713/168 |
| 2007/0130457 A1* | 6/2007 | Kamat | H04L 63/0281 |
| | | | 713/151 |
| 2007/0204154 A1* | 8/2007 | Swander | H04L 63/0218 |
| | | | 713/166 |
| 2008/0267177 A1* | 10/2008 | Johnson | H04L 63/0227 |
| | | | 370/389 |
| 2008/0289027 A1* | 11/2008 | Yariv | H04L 63/0227 |
| | | | 726/11 |
| 2009/0328192 A1* | 12/2009 | Yang | H04L 12/4641 |
| | | | 726/15 |
| 2011/0271096 A1* | 11/2011 | Bharrat | H04L 63/0485 |
| | | | 713/153 |
| 2011/0271097 A1 | 11/2011 | Joachimpillai et al. | |
| 2012/0215911 A1* | 8/2012 | Raleigh | H04M 15/66 |
| | | | 709/224 |
| 2012/0221955 A1* | 8/2012 | Raleigh | H04L 12/1485 |
| | | | 715/736 |
| 2014/0140213 A1* | 5/2014 | Raleigh | H04L 65/601 |
| | | | 370/235 |
| 2014/0192808 A1* | 7/2014 | Thubert | H04L 45/64 |
| | | | 370/392 |
| 2017/0272410 A1* | 9/2017 | Vaarala | H04L 63/0281 |

OTHER PUBLICATIONS

Rogers, Timothy; "IP Security in Windows 2000: Step-by-Step"; 2001; Retrieved from the internet https://www.sans.org/reading-room/whitepapers/windows/paper/186; pp. 1-21, as printed. (Year: 2001).*

Klemencic, Joe; Securing Windows 2000 Communications with IP Security Filters; 2002; Retrieved from the Internet https://community.broadcom.com/symantecenterprise/communities/community-home/librarydocuments/viewdocument; pp. 1-23, as printed. (Year: 2002).*

Keromytis; "Tagging Data in the Network Stack: mbuf_tags"; 2003; retrieved from the Internet https://www.usenix.org/legacy/event/bsdcon03/tech/full_papers/keromytis/keromytis_html/; pp. 1-7, as printed. (Year: 2003).*

Karrer; "EC: an edge-based architecture against DDos attacks and malware spread"; 2006; Retrieved from the Internet https://ieeexplore.ieee.org/abstract/document/1620352; pp. 1-5, as printed. (Year: 2006).*

Extended European Search Report issued in application No. 19157171.0, dated Jul. 11, 2019, 70 pages.

Wikipedia Contributors, "Firewall (Computing)", retrieved on Aug. 1, 2019, retrieved from : URL <:https://en.wikipedia.org/w/index.php?title=firewall_(computing)&oldid=822119349>, 7 pages.

Communication Pursuant to Article 94 (3) EPC issued in European Application No. 19157171.0 dated Mar. 25, 2021, 6 pages.

Microsoft.com [online], "Step-by-Step Guide to Internet Protocol Security (IPSec)", Feb. 2000 [retrieved on Mar. 19, 2021], retrieved from: URL <https://di-srv.unisa.it/professori/ads/corso-security/www/CORSO-0001/win2000/ipsec/ipecsteps.htm>, 26 pages.

* cited by examiner

FIREWALL INCORPORATING NETWORK SECURITY INFORMATION

TECHNICAL FIELD

This disclosure relates to firewall configurations in computer networks.

BACKGROUND

A firewall can reduce or eliminate unwanted network communications by filtering incoming and outgoing traffic based on a set of predefined firewall configurations. For example, a firewall configured on a computing device can allow incoming traffic from certain Internet Protocol (IP) addresses or IP address ranges to access a particular local Transmission Control Protocol (TCP) or User Datagram Protocol (UDP) port on the computing device, or allow outgoing traffic from a certain TCP/UDP port on the computing device to access particular IP addresses or IP address ranges.

DESCRIPTION OF DRAWINGS

Like reference numbers and designations in the various drawings indicate like elements.

DETAILED DESCRIPTION

Figure 1:
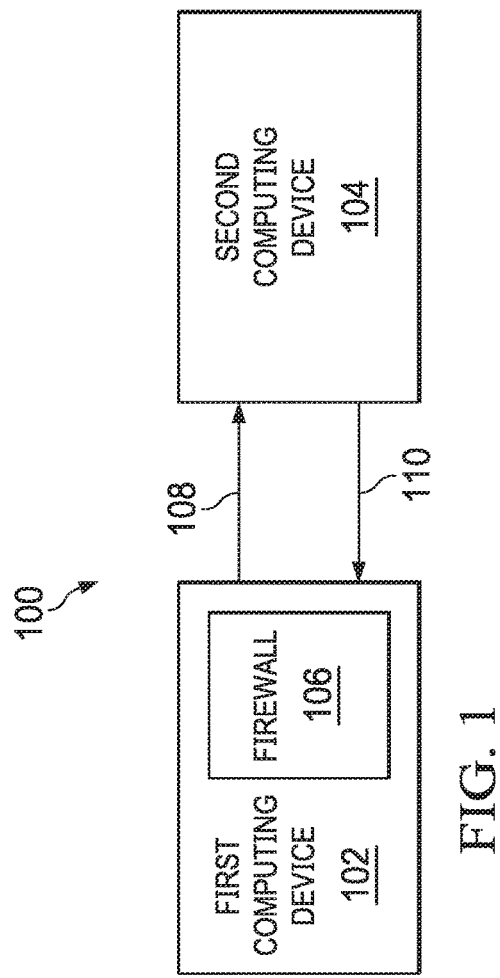
FIG. 1 is an example communication system including a firewall incorporating network security information according to some implementations.

The present disclosure is directed to a firewall incorporating network security information. In some cases, a firewall is used to reduce or eliminate unwanted network communications while allowing legitimate communications. For example, the firewall can be configured to filter incoming and outgoing traffic based on Internet Protocol (IP) addresses, allowing traffic coming from or transmitted to certain IP addresses or IP address ranges (e.g., classless inter-domain routing (CIDR) ranges). However, in a large computer network or a network of dynamic IP addresses, maintaining a list of IP addresses or IP address ranges in a firewall can be difficult. For example, in a cloud computing network, a computer can have a different IP address each time the computer is restarted. As a result, the firewall configuration has to be frequently updated based on the dynamically changing IP addresses.

Network security protocols, such as Internet Protocol Security (IPsec), Transport Layer Security (TLS), and datagram TLS (DTLS), can provide secured communications by authenticating and/or encrypting network traffic over a network. For example, at the beginning of a communication session, the IPsec protocol establishes mutual authentication between two computing devices (or hosts) and negotiates cryptographic keys and parameters to use during the session. IPsec enables a pair of computing devices (and/or subnets beyond the computing devices) to exchange encrypted traffic after authenticating each other, e.g., in the form of a pre-configured virtual private network (VPN). Opportunistic security protocols (e.g., opportunistic IPsec, opportunistic TLS, tcpcrypt, or obfuscated Transmission Control Protocol (TCP)) can also be implemented so that secured communications are enabled with less pre-configuration. For example, when connecting to each other, a pair of computing devices can attempt to encrypt the communication channel using IPsec, and fall back to unencrypted communication if the attempt is failed.

In some cases, the firewall can be configured to trigger network security protocols. For example, a firewall can trigger an IPsec protocol or an Internet Key Exchange (IKE) protocol of IPsec (IKE is a part of IPsec) for establishing an encrypted communication link if the current network traffic is not encrypted. For instance, if a destination host receives unencrypted traffic from a source host, the firewall can instruct the destination host to trigger the IKE protocol and establish an encrypted communication link with the source host.

In some cases, the firewall can be configured to incorporate information of network security protocols. For example, the firewall can include information exchanged during the IKE/IPsec, or information directly or indirectly derived from the information exchanged during the IKE/IPsec. In some implementations, based on the information exchange during the IPsec at the beginning of a communication session, an identity of a host can be verified. By doing so, instead of filtering network traffic basing on IP addresses, the firewall can filter the traffic based on an identity of a host. For example, when host A receives incoming traffic from host B, although host A does not recognize host B's IP address, as long as host A can cryptographically verify host B's identity (e.g., prove that host B is a true BLACKBERRY host using the information exchanged during the IPsec), host A allows the incoming traffic. Similarly, when host A sends outgoing traffic to host B, although host A does not recognize host B's IP address, as long as host A can verify host B's identity, host A allows the outgoing traffic.

FIG. 1 is an example communication system 100 including a firewall incorporating network security information according to some implementations. In some implementations, a firewall is configured at a first computing device. The firewall is configured to trigger or initiate the first computing device to establish a secured connection with a second computing device in response to determining that a data packet received from the second computing device or to be transmitted to the second computing device is unencrypted. The first computing device detects a data packet, where the data packet is received from the second computing device or to be transmitted to the second computing device. In response to detecting that the data packet is unencrypted, a secured connection can be established between the first computing device and the second computing device.

In some cases, in response to successfully establishing the secured connection, the first computing device communicates encrypted data packets with the second computing device using the secured connection. In response to a failure of establishing the secured connection, the first computing device communicates unencrypted data packets with the second computing device. The firewall can be configured in an operating system of the first computing device. The secured connection can be established using IPsec, and establishing the secured connection can include generating a security association (SA) for the secured connection.

In some implementations, the first computing device can verify an identity of the second computing device based on information exchanged during IKE of the IPsec. In response to verifying the identity of the second computing device, a first tag is associated with the SA to indicate the verified identity of the second computing device. In some cases, the firewall can be further configured to include a second tag. The firewall is configured to allow a second data packet in response to determining that the second data packet is encrypted and that the first tag in the SA matches the second tag configured in the firewall.

The firewall incorporating network security information, according to methods and systems described herein, can trigger security protocols (e.g., IKE/IPsec) to enable a secured communication link. Further, instead of filtering network traffic basing on IP addresses, the described firewall can filter traffic based on an identity of a host that is cryptographically verified using information exchanged during the security protocols.

The example communication system 100 includes a first computing device 102 and a second computing device 104. The first computing device 102 includes a firewall 106. The firewall 106 is a system configured with one or more firewall rules to filter incoming traffic or packet 110 or outgoing traffic or packet 108. Separate firewall rules can be maintained for the incoming traffic 110 and the outgoing traffic 108. The firewall 106 can be implemented in an operating system of the first computing device 102. For example, the firewall can be implemented using various tools such as iptables of a LINUX operating system, open BERKELEY Software Distribution (OpenBSD), CISCO adaptive security appliance (ASA), MICROSOFT WINDOWS Firewall, or MACINTOSH operating system (MacOS) Firewall. In some implementations, the firewall 106 can be implemented by a software which is not part of the operating system of the first computing device 102. The firewall 106 can be implemented by software, hardware, or a combination of software and hardware.

In some cases, the second computing device 104 can also have a firewall. In some cases, the first computing device 102 can be a computing device connecting two subnets, and the firewall 106 can filter the traffic between the two subnets. In some cases, the first computing device 102 connects to a subnet, the second computing device 104 connects to another subnet, and the firewalls on the computing devices 102 and 104 can filter the traffic between the two subnets.

In some cases, the firewall 106 can trigger security protocols (e.g., IKE/IPsec, TLS, DTLS, opportunistic IPsec, opportunistic TLS, tcpcrypt, or obfuscated TCP) to establish a secured link if the incoming traffic 110 or the outgoing traffic 108 is unencrypted. After successfully establishing the secured link, the computing devices 102 and 104 can communicate with each other using encrypted data. If the secured link fails to be established, the computing devices 102 and 104 communicate with each other using unencrypted data (e.g., opportunistic security protocols). In some cases, the computing devices 102 rejects the communications with the second computing device 104 if the secured link fails to be established.

Figure 2:
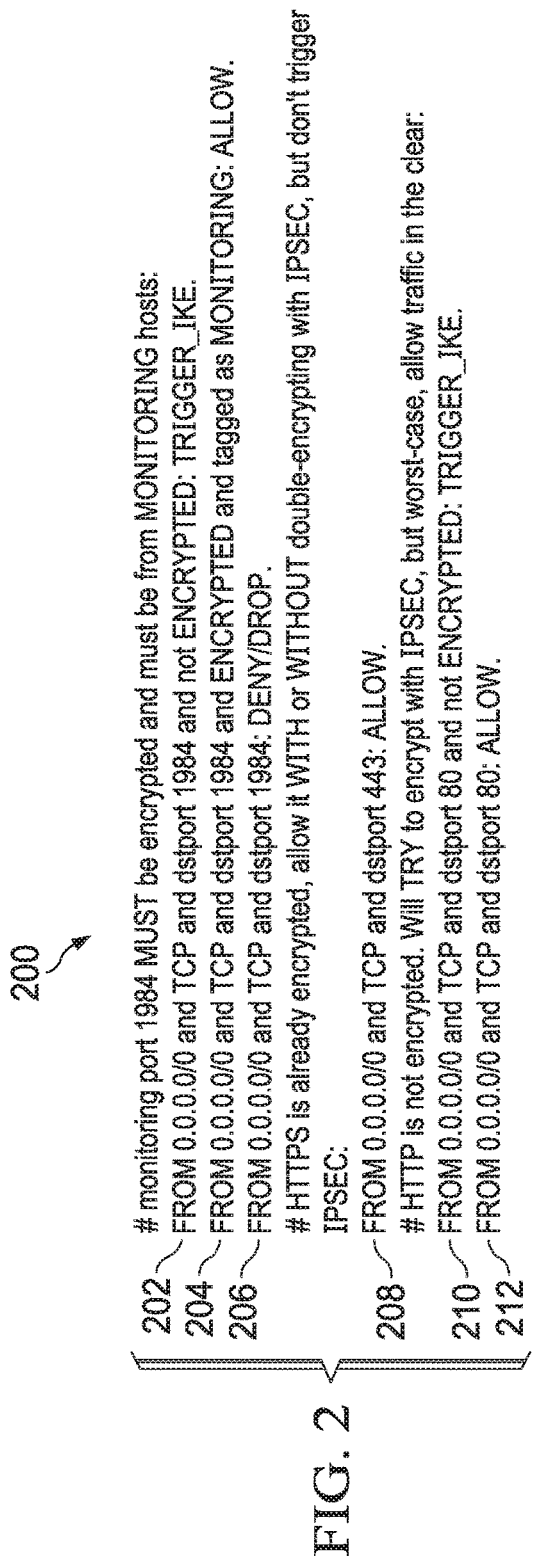
FIG. 2 illustrates an example firewall configuration incorporating network security information according to some implementations.

FIG. 2 illustrates an example firewall configuration 200 incorporating network security information according to some implementations. The example firewall configuration 200 including rules 202-212 implemented at the firewall 106. The firewall rules 202-212 are applied to the incoming traffic 110.

The firewall rule 202 is an example of using a firewall to trigger security protocols. The firewall rule 202 instructs the first computing device 102 to trigger IKE if an unencrypted incoming packet is a TCP packet received from any source IP address (e.g., IP address 0.0.0.0/0 indicates any IPv4 address) and going to a destination TCP port 1984 on the first computing device 102. In some cases, when receiving an incoming packet 110 from the second computing device 104, the first computing device 102 can examine headers of the incoming packet 110. The first computing device 102 can determine that the incoming packet 110 is encrypted if the incoming packet 110 includes an authentication header (AH) or encapsulating security payload (ESP) header. If the incoming packet 110 does not have an AH or ESP header, the first computing device 102 can determine that the incoming packet 110 is unencrypted. The first computing device 102 can further examine the headers of the incoming packet 110 to determine whether the packet 110 includes a TCP packet and the TCP destination port. Upon determining the incoming packet being unencrypted and including a TCP packet with a destination port 1984, the first computing device 102 can trigger IKE with the second computing device 104.

In some cases, a component in the first computing device 102 other than the firewall 106 can decode the incoming packet 110 and send information of the incoming packet 110 to the firewall 106 (e.g., whether the incoming packet 110 is encrypted, the destination port, and the transport layer protocol) so that the firewall 106 can apply firewall rules. In response to determining that the incoming packet is unencrypted, the firewall 106 can transmit a message to another component in the first computing device 102 other than the firewall 106 so that the other component can perform the IKE procedure.

In some cases, a similar firewall rule can be applied to the outgoing traffic. For example, if the computing device 102 determines that an outgoing packet 108 to the second computing device 104 is unencrypted, the firewall can trigger IKE to establish a secured link.

In some implementations, the first computing device 102 and the second computing device 104 use the IPsec protocol to enable secured communications between the computing devices 102 and 104. Furthermore, the IKE protocol can be used to generate, exchange, or negotiate IPsec security parameters and information for a one-way traffic flow and establish a security association (SA). Each SA can include the security parameters and information (e.g., cryptographic algorithm/mode, public/private encryption keys, or certificate) that are being used to encrypt and authenticate a traffic flow in one direction. For example, upon establishing the secured communications between the computing devices 102 and 104, two SAs are established, e.g., SA1 for the outgoing traffic 108 and SA2 for the incoming traffic 110. An SA database can be used to store the security parameters and information of each SA. For example, after the IKE protocol establishes an SA, the IKE can automatically populate the SA database with the security parameters and information of that SA. Each of the computing devices 102 and 104 can have an SA database. For example, after IKE establishes SA1 and SA2 for the traffic 108 and 110, both SA databases can store the security parameters and information of SA1 and SA2.

The packet 108 or 110 can include an index (e.g., security parameters index (SPI)) in the header of the packet that identifies the associated SA (the SA associated with the one-way traffic flow of the packet) stored in the SA database. For example, after the first computing device 102 establishes the secured communication link with the second computing device 104, the encrypted packets 108 and 110 can include an AH or ESP header. The AH or ESP header includes SPI. When the first computing device 102 receives the encrypted incoming packet 110, the first computer device 102 can identify SPI from the AH or ESP header of the packet 110, and use the SPI to identify the associated SA (i.e., SA2) from the SA database. Similarly, when the first computing device 102 transmits the encrypted outgoing packet 108, the first computer device 102 can identify SPI from the AH or ESP header of the packet 108, and use the SPI to identify the associated SA (i.e., SA1) from the SA database. In some implementations, SPI, IP destination address in the packet header, and a security protocol (AH or ESP) identifier are used together to identify the SA for the packet.

In some implementations, based on the security information and parameters exchanged during the IKE/IPsec or based on information directly or indirectly derived from the information exchanged during the IKE/IPsec, the first computing device 102 can determine whether the second computing device 104 has one or more cryptographically proved identities (e.g., a true BLACKBERRY host). In some cases, the first computing device 102 can prove a computer device's identity based on a host name or a domain name. For example, if the verified (or authenticated) host name of the second computing device 104 is MonitoringHost.BLACKBERRY.net, the first computing device 102 can consider that the second computing device 104 is a true BLACKBERRY monitoring host.

In some cases, the first computing device 102 can prove a computing device's identity based on a signature in a public key certificate. For example, the second computing device 104 can send the first computing device 102 a public key certificate including the second computing device's public key so that the first computing device 102 can encrypt data transmitted to the second computing device 104 using the second computing device's public key. The certificate is signed by a certificate authority. For example, if the certificate includes a signature of a BLACKBERRY certificate authority, the first computing device 102 can consider that the second computing device 104 is a true BLACKBERRY host. In some cases, the first computing device 102 may further verify the identity of the certificate authority. After verifying that the certificate is issued by a true BLACKBERRY certificate authority, the first computing device 102 can consider that the second computing device 104 is a true BLACKBERRY host.

In some cases, the certificate can be signed by a certificate authority along with a number of signed assertions. For example, assuming that the second computing device 104 is MonitoringHost.BLACKBERRY.net, the certificate can include a signature of a BLACKBERRY certificate authority along with assertion(s) such as "BLACKBERRY CA hereby certifies that MonitoringHost.BLACKBERRY.net is a BLACKBERRY host, a MONITORING host, a PRODUCTION host, a CANADIAN host" and the first computing device 102 is configured to trust (cryptographically verified and signed) assertions from the (cryptographically verified) BLACKBERRY CA.

In some cases, the first computing device 102 can use a third-party program to prove the second computing device's identity. For example, the first computing device 102 can send the security information obtained during IKE/IPsec to the third-party program for verifying the second computing device's identity.

In some cases, after the second computing device's identity is verified, the first computing device 102 can add a tag for the associated SAs in the SA database. The tag can be included in the SA database and linked to the associated SAs. For example, if the second computing device 104 is verified to be a true BLACKBERRY monitoring host, the first computing device 102 can add a tag "MONITORING" for SA1 and SA2 in the SA database (the SA database at the first computing device 102).

In some cases, multiple tags can be associated with an SA. For example, after the first computing device 102 verifies that the second computing device 104 is a BLACKBERRY monitoring host and a Canadian host, the first computing device 102 can add two tags "MONITORING" and "CANADA" for SA1 and SA2 in the SA database. The tag(s) not only indicate that the identity/ies of the second computing device 104 have been verified, but also indicate what the verified identity/ies of the second computing device 104 are. The tag(s) can also indicate other verified information about the second computing device 104. For example, the multiple tags can be "Verified" (indicating that the identity of the second computing device 104 has been verified), "VerifiedByBLACKBERRY", "StrictlyConfidential", "SecurityLevelX" (indicating the second computing device 104 has a security level X), "BLACKBERRYServiceProvider", "Production" (indicating that the second computing device 104 is a production host), "Monitoring" (indicating that the second computing device 104 is a monitoring host), "BBXYZMonitoring", "Canada" (indicating that the second computing device 104 is a Canadian host), "CanadaEast DataCentre", and "MayContainPersonallyIdentifiableInformation".

In some cases, when a third-party program is used to verify the identity/ies of the second computing device 104, the third-party program can return a list of identity tags (any number of identity tags) so that the first computing device 102 can add them to the SA database. In some cases, the third-party program can insert the list of identity tags into the SA database directly.

The firewall rule 204 is an example of a filtering criterion based on an identity of a computing device. For example, the firewall rule 204 filters the incoming traffic 110 based on whether the second computing device 104 has a cryptographically proved identity (e.g., the second computing device 104 has been cryptographically proved to be a true BLACKBERRY monitoring host). The firewall rule 204 allows an incoming packet if the packet is encrypted, has a TCP packet, is received from any source IP address and going to a destination port 1984 on the first computing device 102, and the identity of source host has a tag "MONITORING". In other words, regardless of the IP address of the second computing device 104, the firewall rule 204 filters traffic based on the identity of the second computing device 104.

For example, after the secured link has been established between the computing devices 102 and 104, when the first computing device 102 receives an incoming packet 110 from the second computing devices 104, the first computing device 102 determines if the incoming packet 110 has an AH or ESP header. If the incoming packet 110 has an AH or ESP header, the first computing device 102 determines that the incoming packet 110 is an encrypted packet and determines SPI from the AH or ESP header. The first computing device 102 uses SPI to identify the SA associated with the incoming packet 110 and determines the identity tag(s) associated with the SA. The first computing device 102 further decrypts the incoming packet 110 to determine whether the incoming packet 110 contains a TCP packet. If the incoming packet 110 contains a TCP packet, the first computing device further determines the TCP destination port from the decrypted packet. If the identity tag(s) and the destination port match those specified in the firewall rule 204 (i.e., tag "MONITORING" and port 1984), the firewall 106 allows the packet 110.

In some implementations, the first computing device 102 can determine whether the packet 110 is encrypted and use the SPI in the encrypted packet to determine the identity tags of the associated SA. The computing device 102 can retain or store these tags, and go on to decrypt the packet 110. From the decrypted packet, the computing device 102 determines whether the packet 110 contains a TCP packet and the destination port. After collecting the information of the packet 110, the computing device 102 can send these information to the firewall 106 (e.g., whether the packet 110 is encrypted, the identity tags, whether the packet 110 includes a TCP packet, and the destination port). The firewall 106 determines whether to drop or deny the packet 110 by matching the information from the encrypted packet (e.g., the identity tags) and the decrypted packet (e.g., whether there is a TCP packet and the destination port) against the firewall rule 204. One or more components in the first computing device 102 other than the firewall 106 can be used to determine the information of the packet 110 (e.g., whether the packet 110 is encrypted, the identity tags, whether the packet 110 includes a TCP packet, and the destination port).

In some cases, a firewall rule similar to 204 can be applied to the outgoing traffic. For example, the firewall 106 can allow the outgoing traffic if the first computing device 102 can verify the identity of the second computing device 104.

In some cases, a firewall configuration can include multiple identities of a computing device. As discussed above, multiple tags can be associated with an SA. For example, if the second computing device 104 is confirmed to be a BLACKBERRY monitoring host and a Canadian host, the related SA can have two tags "MONITORING" and "CANADA". The firewall can also include multiple tags such as "MONITORING" and "CANADA", and the firewall 106 can allow traffic if the SA associated with the traffic has the tags specified in the firewall.

In FIG. 2, the firewall rules 202, 204, and 206 are for TCP traffic that goes to the destination port 1984, the firewall rule 208 is for Hypertext Transfer Protocol Secure (HTTPS) traffic, and the firewall rules 210 and 212 are for Hypertext Transfer Protocol (HTTP) traffic. The firewall 106 usually matches traffic against the list of firewall rules in a sequence.

For example, for the TCP traffic goes to the destination port 1984, the firewall 106 examines the traffic against the firewall rules in an order of 202, 204, and 206 until a matched firewall rule is found and a decision of allowing or denying the packet is made. For instance, upon receiving an unencrypted incoming packet, since the packet is unencrypted and matches the firewall rule 202, the firewall 106 triggers IKE. Meanwhile, since a decision of allowing or denying the packet has not been made, the firewall 106 continues to determine whether the packet matches the firewall rule 204. Since the packet is unencrypted, the firewall rule 204 does not match. The firewall 106 then continues to determine whether the packet matches the firewall rule 206. Since the packet matches the firewall rule 206, the packet is dropped.

After establishing the secured link using IKE, upon receiving an encrypted incoming packet, since the packet is encrypted and does not match the firewall rule 202, the firewall 106 determines whether the packet matches the firewall rule 204. If the packet is associated with the tag "MONITORING", the firewall 106 allows the packet. If the packet is not associated with the tag "MONITORING", the firewall 106 further applies the firewall rule 206 and drops the packet.

The firewall rule 208 is an example firewall configuration for HTTPS traffic (e.g., traffic goes to the port 443), which simply allows the HTTPS traffic.

The firewall rules 210 and 212 are example firewall configurations for HTTP traffic (e.g., traffic goes to the port 80). The firewall rules 210 and 212 implement opportunistic IPsec (i.e., attempt to establish a secured link, but accept unencrypted packets as a fallback). Upon receiving an unencrypted HTTP packet, since the packet is unencrypted and matches the firewall rule 210, the firewall 106 triggers IKE. Meanwhile, since a decision of allowing or denying the packet has not been made, the firewall 106 continues to determine whether the packet matches the firewall rule 212. Since the packet matches the firewall rule 212, the packet is allowed (i.e., allow unencrypted traffic as a fallback). After establishing the secured link using IKE, upon receiving an encrypted HTTP packet, the firewall 106 first applies the firewall rule 210. Since the firewall rule 210 does not apply to the encrypted traffic, the firewall 106 then applies the firewall rule 212 and allows the packet.

In some cases, security data in the SA can be incorporated into the firewall configuration. For example, the SA can include SA ID and an identity of an entity who signs the SA. For instance, the following firewall configuration can be applied to the incoming traffic 110: FROM 0.0.0.0/0 and TCP and dstport 1984 and ENCRYPTED and SA_ID matches "*.monitoring.blackberry.com" and SA_SIGNED_BY "ipsec-ca.blackberry.com": ALLOW In this case, when the incoming packet 110 arrives at the firewall 106, the firewall 106 determines if the incoming packet 110 has an AH or ESP header. If the incoming packet 110 has an AH or ESP header, the first computing device 102 determines that the incoming packet 110 is an encrypted packet and identifies SPI from the AH header or the ESP header. Using SPI, security data in the SA can be identified from the SA database. The computing device 102 can retain (or store) the security data, and go on to decrypt the packet 110. From the decrypted packet, the computing device 102 determines whether the packet 110 contains a TCP packet and the destination port. The firewall 106 determines whether to drop or deny the packet 110 based on whether the security data from the SA database and the information from the decrypted packet match the firewall rule (e.g., if the SA_ID and SA_SIGNED_BY indicated in the SA match "*.monitoring.blackberry.com" and "ipsec-ca.blackberry.com", respectively, and if the destination port is 1984).

Figure 3:
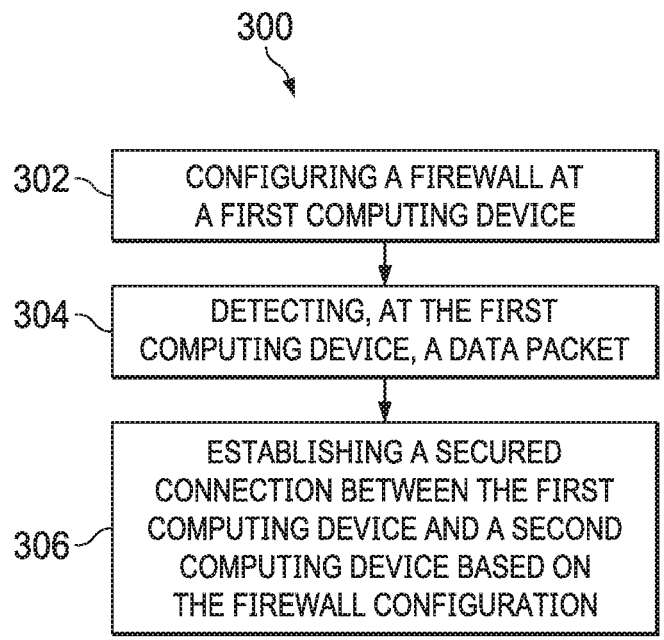
FIG. 3 is a flowchart illustrating a first example method for implementing a firewall incorporating network security information according to some implementations.

FIG. 3 is a flowchart illustrating a first example method 300 for implementing a firewall incorporating network security information according to some implementations. For clarity of presentation, the description that follows generally describes method 300 in the context of the other figures in this description. However, it will be understood that method 300 may be performed, for example, by any suitable system, environment, software, and hardware, or a combination of systems, environments, software, and hardware as appropriate. In some implementations, various steps of method 300 can be run in parallel, in combination, in loops, or in any order.

At block 302, a firewall is configured at a first computing device. The firewall can be configured to initiate the first computing device to establish a secured connection with a second computing device in response to determining that a data packet received from the second computing device or to be transmitted to the second computing device is unencrypted. For example, the firewall can instruct the first computing device to trigger IKE/IPsec to establish the secured connection. At block 304, the first computing device detects a data packet, where the data packet is received from the second computing device or to be transmitted to the second computing device. At block 306, in response to detecting that the data packet is unencrypted, the first computing device establishes a secured connection between the first computing device and the second computing device based on the firewall configuration. For example, if the data packet does not have an AH or ESP header, the first computing device can determine that the data packet is an unencrypted packet and IKE/IPsec is triggered to establish the secured connection.

Figure 5:
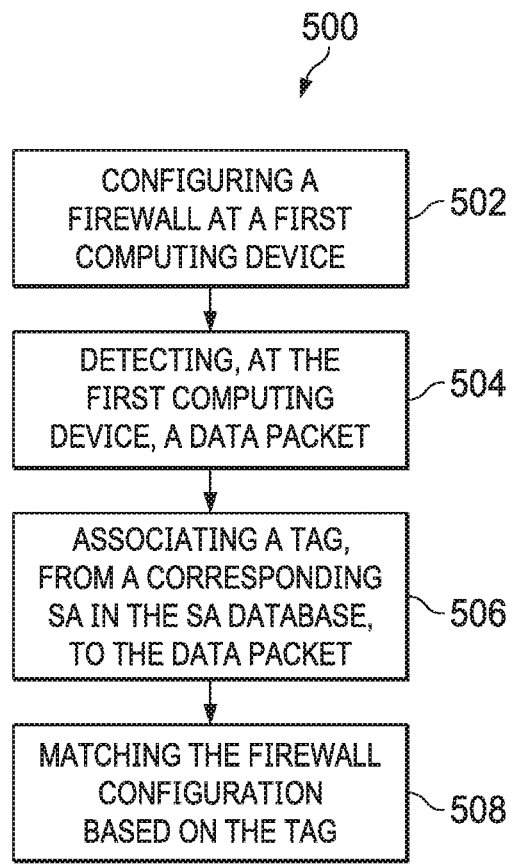
FIG. 5 is a flowchart illustrating a second example method for implementing a firewall incorporating network security information according to some implementations.

FIG. 5 is a flowchart illustrating a second example method 500 for implementing a firewall incorporating network security information according to some implementations. For clarity of presentation, the description that follows generally describes method 500 in the context of the other figures in this description. However, it will be understood that method 500 may be performed, for example, by any suitable system, environment, software, and hardware, or a combination of systems, environments, software, and hardware as appropriate. In some implementations, various steps of method 500 can be run in parallel, in combination, in loops, or in any order.

At block 502, a firewall is configured at a first computing device. The firewall can be configured to include including identity tag(s) of the second computing device. At block 504, the first computing device detects a data packet, where the data packet is received from the second computing device or to be transmitted to the second computing device. At block 506, in response to detecting that the data packet is encrypted, the first computing device determines the identity tag(s) of the SA associated with the data packet. For example, the packet is encrypted if the packet has an AH or ESP header. Using SPI from the AH or ESP header of the encrypted packet, the first computing device can search the SA database and determine the identity tag(s) associated with the SA. At block 508, the firewall can filter the packet based on the identity tag(s) of the SA matching the tags in the firewall configuration.

In some cases, in addition to the information from the encrypted packet (e.g., SA-related information using SPI), the firewall can also include filtering criteria based on information in the decrypted packet (e.g., TCP destination port). In that case, at block 506, the first computing device retains (or stores) the determined identity tags, and then decrypts the packet. At block 508, the first computing device can collect information based on the encrypted packet (e.g., the identity tags) and the information based on the decrypted packet (e.g., TCP destination port or other information from decrypted fields such as TCP/UDP/payload fields), and match the collected information against the firewall configuration.

Figure 4:
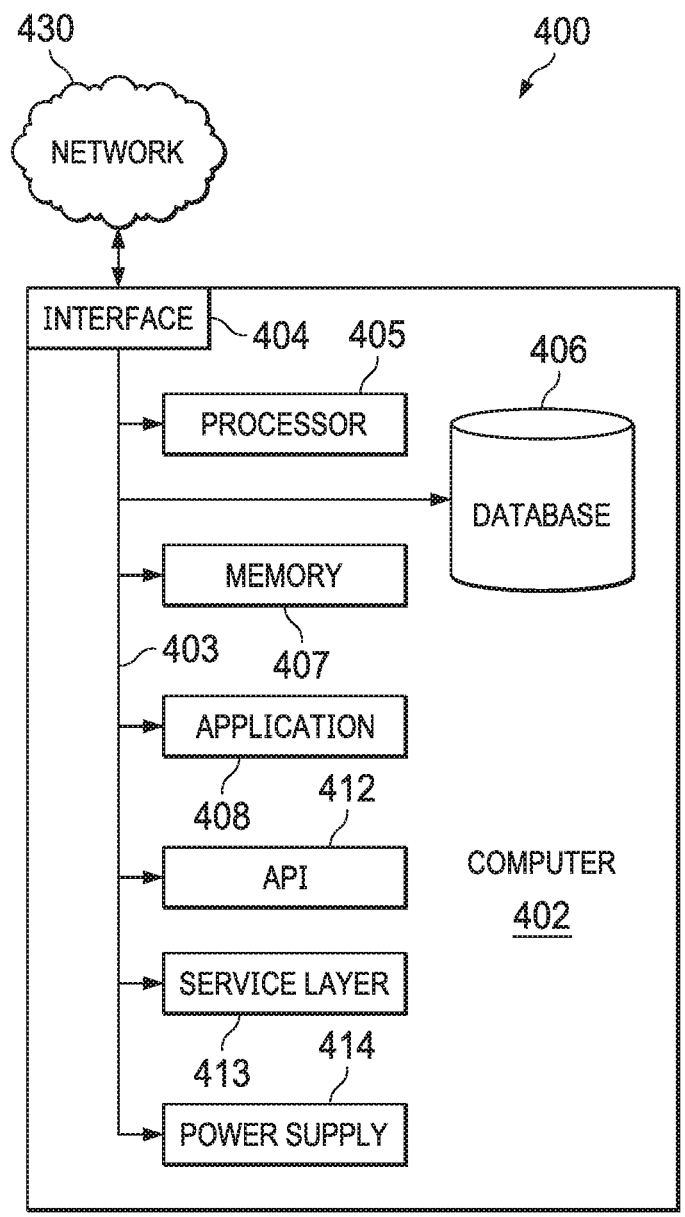
FIG. 4 is a block diagram illustrating an example of a computer-implemented system used to provide computational functionalities associated with described algorithms, methods, functions, processes, flows, and procedures, according to some implementations of the present disclosure.

FIG. 4 is a block diagram illustrating an example of a computer-implemented System 400 used to provide computational functionalities associated with described algorithms, methods, functions, processes, flows, and procedures, according to some implementations of the present disclosure. In the illustrated implementation, System 400 includes a Computer 402 and a Network 430. For example, the computing devices 102 and 104 can be implemented by the Computer 402.

The illustrated Computer 402 is intended to encompass any computing device such as a server, desktop computer, laptop/notebook computer, wireless data port, smart phone, personal data assistant (PDA), tablet computer, one or more processors within these devices, another computing device, or a combination of computing devices, including physical or virtual instances of the computing device, or a combination of physical or virtual instances of the computing device. Additionally, the Computer 402 can include an input device, such as a keypad, keyboard, touch screen, another input device, or a combination of input devices that can accept user information, and an output device that conveys information associated with the operation of the Computer 402, including digital data, visual, audio, another type of information, or a combination of types of information, on a graphical-type user interface (UI) (or GUI) or other UI.

The Computer 402 can serve in a role in a distributed computing system as a client, network component, a server, a database or another persistency, another role, or a combination of roles for performing the subject matter described in the present disclosure. The illustrated Computer 402 is communicably coupled with a Network 430. In some implementations, one or more components of the Computer 402 can be configured to operate within an environment, including cloud-computing-based, local, global, another environment, or a combination of environments.

At a high level, the Computer 402 is an electronic computing device operable to receive, transmit, process, store, or manage data and information associated with the described subject matter. According to some implementations, the Computer 402 can also include or be communicably coupled with a server, including an application server, e-mail server, web server, caching server, streaming data server, another server, or a combination of servers.

The Computer 402 can receive requests over Network 430 (for example, from a client software application executing on another Computer 402) and respond to the received requests by processing the received requests using a software application or a combination of software applications. In addition, requests can also be sent to the Computer 402 from internal users (for example, from a command console or by another internal access method), external or third-parties, or other entities, individuals, systems, or computers.

Each of the components of the Computer 402 can communicate using a System Bus 403. In some implementations, any or all of the components of the Computer 402, including hardware, software, or a combination of hardware and software, can interface over the System Bus 403 using an application programming interface (API) 412, a Service Layer 413, or a combination of the API 412 and Service Layer 413. The API 412 can include specifications for routines, data structures, and object classes. The API 412 can be either computer-language independent or dependent and refer to a complete interface, a single function, or even a set of APIs. The Service Layer 413 provides software services to the Computer 402 or other components (whether illustrated or not) that are communicably coupled to the Computer 402. The functionality of the Computer 402 can be accessible for all service consumers using the Service Layer 413. Software services, such as those provided by the Service Layer 413, provide reusable, defined functionalities through a defined interface. For example, the interface can be software written in JAVA, C++, another computing language, or a combination of computing languages providing data in extensible markup language (XML) format, another format, or a combination of formats. While illustrated as an integrated component of the Computer 402, alternative implementations can illustrate the API 412 or the Service Layer 413 as stand-alone components in relation to other components of the Computer 402 or other components (whether illustrated or not) that are communicably coupled to the Computer 402. Moreover, any or all parts of the API 412 or the Service Layer 413 can be implemented as a child or a sub-module of another software module, enterprise application, or hardware module without departing from the scope of the present disclosure. In some cases, the Service Layer 413 can include an operating system, and the firewall 106 can be included in the Service Layer 413 if the firewall 106 is implemented in an operating system.

The Computer 402 includes an Interface 404. Although illustrated as a single Interface 404, two or more Interfaces 404 can be used according to particular needs, desires, or particular implementations of the Computer 402. The Interface 404 is used by the Computer 402 for communicating with another computing system (whether illustrated or not) that is communicatively linked to the Network 430 in a distributed environment. Generally, the Interface 404 is operable to communicate with the Network 430 and includes logic encoded in software, hardware, or a combination of software and hardware. More specifically, the Interface 404 can include software supporting one or more communication protocols associated with communications such that the Network 430 or hardware of Interface 404 is operable to communicate physical signals within and outside of the illustrated Computer 402.

The Computer 402 includes a Processor 405. Although illustrated as a single Processor 405, two or more Processors 405 can be used according to particular needs, desires, or particular implementations of the Computer 402. Generally, the Processor 405 executes instructions and manipulates data to perform the operations of the Computer 402 and any algorithms, methods, functions, processes, flows, and procedures as described in the present disclosure.

The Computer 402 also includes a Database 406 that can hold data for the Computer 402, another component communicatively linked to the Network 430 (whether illustrated or not), or a combination of the Computer 402 and another component. For example, Database 406 can be an in-memory, conventional, or another type of database storing data consistent with the present disclosure. In some implementations, Database 406 can be a combination of two or more different database types (for example, a hybrid in-memory and conventional database) according to particular needs, desires, or particular implementations of the Computer 402 and the described functionality. Although illustrated as a single Database 406, two or more databases of similar or differing types can be used according to particular needs, desires, or particular implementations of the Computer 402 and the described functionality. While Database 406 is illustrated as an integral component of the Computer 402, in alternative implementations, Database 406 can be external to the Computer 402.

The Computer 402 also includes a Memory 407 that can hold data for the Computer 402, another component or components communicatively linked to the Network 430 (whether illustrated or not), or a combination of the Computer 402 and another component. Memory 407 can store any data consistent with the present disclosure. In some implementations, Memory 407 can be a combination of two or more different types of memory (for example, a combination of semiconductor and magnetic storage) according to particular needs, desires, or particular implementations of the Computer 402 and the described functionality. Although illustrated as a single Memory 407, two or more Memories 407 or similar or differing types can be used according to particular needs, desires, or particular implementations of the Computer 402 and the described functionality. While Memory 407 is illustrated as an integral component of the Computer 402, in alternative implementations, Memory 407 can be external to the Computer 402.

The Application 408 is an algorithmic software engine providing functionality according to particular needs, desires, or particular implementations of the Computer 402, particularly with respect to functionality described in the present disclosure. For example, Application 408 can serve as one or more components, modules, or applications. Further, although illustrated as a single Application 408, the Application 408 can be implemented as multiple Applications 408 on the Computer 402. In addition, although illustrated as integral to the Computer 402, in alternative implementations, the Application 408 can be external to the Computer 402. In some cases, the Applications 408 can include the firewall 106, e.g., if the firewall 106 is implemented by a software that is not part of an operating system.

The Computer 402 can also include a Power Supply 414. The Power Supply 414 can include a rechargeable or non-rechargeable battery that can be configured to be either user- or non-user-replaceable. In some implementations, the Power Supply 414 can include power-conversion or management circuits (including recharging, standby, or another power management functionality). In some implementations, the Power Supply 414 can include a power plug to allow the Computer 402 to be plugged into a wall socket or another power source to, for example, power the Computer 402 or recharge a rechargeable battery.

There can be any number of Computers 402 associated with, or external to, a computer system containing Computer 402, each Computer 402 communicating over Network 430. Further, the term "client," "user," or other appropriate terminology can be used interchangeably, as appropriate, without departing from the scope of the present disclosure. Moreover, the present disclosure contemplates that many users can use one Computer 402, or that one user can use multiple computers 402.

While operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be employed. Moreover, the separation of various system components in the implementation descried above should not be understood as requiring such separation in all implementations, and it should be understood that the described program components and systems can generally be integrated together in a signal software product or packaged into multiple software products.

Also, techniques, systems, subsystems, and methods described and illustrated in the various implementations as discrete or separate may be combined or integrated with other systems, modules, techniques, or methods. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and may be made.

While the above detailed description has shown, described, and pointed out the fundamental novel features of the disclosure as applied to various implementations, it will be understood that various omissions, substitutions, and changes in the form and details of the system illustrated may be made by those skilled in the art. In addition, the order of method steps is not implied by the order they appear in the claims.

The invention claimed is:

1. A method, comprising:
configuring a firewall at a first computing device, wherein, in response to determining that a data packet received from a second computing device is unencrypted and that the data packet comprises a particular destination port, the firewall is configured to initiate the first computing device to establish a secured connection with the second computing device;
detecting, at the first computing device, the data packet received from the second computing device;
in response to determining the data packet being unencrypted and the data packet comprising the particular destination port, establishing the secured connection between the first computing device and the second computing device; and
in response to establishing the secured connection between the first computing device and the second computing device, communicating encrypted data packets with the second computing device using the secured connection, wherein the communicating encrypted data packets with the second computing device using the secured connection comprises:
receiving, an encrypted data packet from the second computing device;
determining a first tag that associates with a security parameter index (SPI), wherein the SPI indicates a security association (SA) associated with the secured connection, the first tag indicates that the second computing device has a verified identity, and the first tag is different than the SPI; and
accepting the encrypted data packet based on matching the first tag with a pre-configured second tag.

2. The method of claim 1, wherein the firewall is configured in an operating system of the first computing device.

3. The method of claim 1, wherein the secured connection is established using Internet Protocol Security (IPsec).

4. The method of claim 3, wherein establishing the secured connection includes generating the SA for the secured connection; wherein the method further comprising:
determining that the second computing device has the verified identity based on information exchanged during Internet Key Exchange (IKE) of the IPsec; and
in response to determining that the second computing device has the verified identity, associating the first tag with the SA to indicate the verified identity of the second computing device.

5. The method of claim 4,
wherein the firewall is further configured to include the second tag, and the firewall accepts the encrypted data packet in response to determining that the first tag matches the second tag configured in the firewall.

6. A first computing device, comprising:
a memory; and
at least one hardware processor communicatively coupled with the memory and configured to:
configure a firewall at the first computing device, wherein, in response to determining that a data packet received from a second computing device is unencrypted and that the data packet comprises a particular destination port, the firewall is configured to initiate the first computing device to establish a secured connection with the second computing device;
detect the data packet at the first computing device, wherein the data packet is received from the second computing device;
in response to determining the data packet being unencrypted and the data packet comprising the particular destination port, establish the secured connection between the first computing device and the second computing device; and
in response to establishing the secured connection between the first computing device and the second computing device, communicate encrypted data packets with the second computing device using the secured connection, wherein the at least one hardware processor is configured to:
receive, an encrypted data packet from the second computing device;
determine a first tag that associates with a security parameter index (SPI), wherein the SPI indicates a security association (SA) associated with the secured connection, the first tag indicates that the second computing device has a verified identity, and the first tag is different than the SPI; and
accept the encrypted data packet based on matching the first tag with a pre-configured second tag.

7. The first computing device of claim 6, wherein the firewall is configured in an operating system of the first computing device.

8. The first computing device of claim 6, wherein the secured connection is established using Internet Protocol Security (IPsec).

9. The first computing device of claim 8, wherein establishing the secured connection includes generating the SA for the secured connection; wherein the at least one hardware processor is further configured to:
determine that the second computing device has the verified identity based on information exchanged during Internet Key Exchange (IKE) of the IPsec; and
in response to determining that the second computing device has the verified identity, associate the first tag with the SA to indicate the verified identity of the second computing device.

10. The first computing device of claim 9, wherein
the firewall is further configured to include the second tag, and the firewall accepts the encrypted data packet in response to determining that the first tag matches the second tag configured in the firewall.

11. A non-transitory computer-readable medium containing instructions which, when executed, cause a first computing device to perform operations comprising:
configuring a firewall at a first computing device, wherein, in response to determining that a data packet received from a second computing device is unencrypted and that the data packet comprises a particular destination port, the firewall is configured to initiate the first computing device to establish a secured connection with the second computing device;
detecting the data packet at the first computing device, wherein the data packet is received from the second computing device;
in response to determining the data packet being unencrypted and the data packet comprising the particular destination port, establishing the secured connection between the first computing device and the second computing device; and in response to establishing the secured connection between the first computing device and the second computing device, communicating encrypted data packets with the second computing device using the secured connection, wherein the communicating encrypted data packets with the second computing device using the secured connection comprises:

receiving, an encrypted data packet from the second computing device;

determining a first tag that associates with a security parameter index (SPI), wherein the SPI indicates a security association (SA) associated with the secured connection, the first tag indicates that the second computing device has a verified identity, and the first tag is different than the SPI; and accepting the encrypted data packet based on matching the first tag with a pre-configured second tag.

12. The non-transitory computer-readable medium of claim 11, wherein the secured connection is established using Internet Protocol Security (IPsec).

13. The non-transitory computer-readable medium of claim 12, wherein establishing the secured connection includes generating the SA for the secured connection; wherein the operations further comprise:

determining that the second computing device has the verified identity based on information exchanged during Internet Key Exchange (IKE) of the IPsec; and in response to determining that the second computing device has the verified identity, associating the first tag with the SA to indicate the verified identity of the second computing device.

14. The non-transitory computer-readable medium of claim 13, wherein the firewall is further configured to include the second tag, and the firewall accepts the encrypted data packet in response to determining that the first tag matches the second tag configured in the firewall.

* * * * *